US012608206B2

(12) United States Patent  
Muller et al.

(10) Patent No.: US 12,608,206 B2  
(45) Date of Patent: Apr. 21, 2026

(54) LOOPING INSTRUCTION

(71) Applicant: XMOS LTD, Bristol (GB)

(72) Inventors: Hendrik Lambertus Muller, London (GB); Andrew Stanford-Jason, London (GB)

(73) Assignee: XMOS LTD, Bristol (GB)

( * ) Notice: Subject to any disclaimer, the term of this patent is extended or adjusted under 35 U.S.C. 154(b) by 0 days.

(21) Appl. No.: 18/841,082

(22) PCT Filed: Jan. 25, 2023

(86) PCT No.: PCT/EP2023/051753  
§ 371 (c)(1),  
(2) Date: Aug. 23, 2024

(87) PCT Pub. No.: WO2023/160930  
PCT Pub. Date: Aug. 31, 2023

(65) Prior Publication Data  
US 2025/0165254 A1 May 22, 2025

(30) Foreign Application Priority Data  
Feb. 24, 2022 (GB) ...................................... 2202580

(51) Int. Cl.  
*G06F 9/30* (2018.01)

(52) U.S. Cl.  
CPC ...... *G06F 9/30065* (2013.01); *G06F 9/30036* (2013.01); *G06F 9/30134* (2013.01)

(58) Field of Classification Search  
CPC .................................................. G06F 9/30065  
See application file for complete search history.

(56) References Cited

U.S. PATENT DOCUMENTS

| | | | | | |
|---|---|---|---|---|---|
| 6,098,163 | A | * | 8/2000 | Guttag | .................... G06F 5/015 712/20 |
| 6,859,870 | B1 | * | 2/2005 | Kim | ...................... G06F 9/3017 712/E9.071 |
| 2010/0122066 | A1 | * | 5/2010 | Fischer | ................. G06F 9/3851 712/E9.058 |

(Continued)

FOREIGN PATENT DOCUMENTS

| | | |
|---|---|---|
| EP | 0511484 A2 | 11/1992 |
| WO | 02/099633 A1 | 12/2002 |

OTHER PUBLICATIONS

Written Opinion of PCT/EP2023/051753 dated May 3, 2023 [PCT/ISA/237].

(Continued)

*Primary Examiner* — Michael J Metzger  
(74) *Attorney, Agent, or Firm* — Sughrue Mion, PLLC

(57) ABSTRACT

A processor (101) with an instruction set comprising a looping instruction and corresponding method are provided. The looping instruction is defined by a corresponding opcode and comprises a register operand for holding a sequence of subinstructions. The looping instruction causes the processor (101) to: repeatedly execute the looping instruction without incrementing a program counter, each execution of the looping instruction comprising: executing one of the subinstructions in the register operand; and modifying the register operand to contain a different set of subinstructions.

15 Claims, 7 Drawing Sheets

(56)           References Cited

U.S. PATENT DOCUMENTS

2010/0274990 A1 * 10/2010 Wilder ................. G06F 9/3893
                                               712/E9.016
2014/0215185 A1 *  7/2014 Danielsen ............ G06F 9/3836
                                               712/205

OTHER PUBLICATIONS

British Search Report of GB2202580.3 dated Oct. 20, 2022.
International Search Report of PCT/EP2023/051753 dated May 3,
2023 [PCT/ISA/210].

* cited by examiner

LOOPING INSTRUCTION

CROSS REFERENCE TO RELATED APPLICATIONS

This application is a National Stage of International Application No. PCT/EP2023/051753 filed on Jan. 25, 2023, claiming priority based on British Patent Application No. 2202580.3 filed on Feb. 24, 2022.

TECHNICAL FIELD

The present disclosure relates to a processor having an instruction set comprising a looping instruction and a method of executing a looping instruction.

BACKGROUND

As used herein, the term "vector" refers to a one-dimensional array of elements (also called "coefficients") indexed by one index value i, and the term "matrix" refers to a two-dimensional (rectangular) array of elements indexed by two index values i, j. A matrix m can be multiplied by an input vector x to generate an output vector v. A simple example is shown below in which the matrix m is a 3×4 matrix (with 3 rows and 4 columns):

$$\begin{pmatrix} v_1 \\ v_2 \\ v_3 \end{pmatrix} = \begin{pmatrix} m_{11} & m_{12} & m_{13} & m_{14} \\ m_{21} & m_{22} & m_{23} & m_{24} \\ m_{31} & m_{32} & m_{33} & m_{34} \end{pmatrix} \cdot \begin{pmatrix} x_1 \\ x_2 \\ x_3 \\ x_4 \end{pmatrix}$$

wherein the elements $v_i$ of the output vector v are calculated as shown below:

$$v_i = \sum m_{ij} \cdot x_j = m_{i1} \cdot x_1 + m_{i2} \cdot x_2 + m_{i3} \cdot x_3 + m_{i4} \cdot x_4$$

That is, each element of the output vector v is equal to the inner ("dot") product of the input vector x with a different respective one of the rows of the matrix m. Hence, the number of rows in the input vector x is the same as the number of columns in the matrix m, and the number of rows in the output vector v is the same as the number of rows in the matrix m.

SUMMARY

According to a first aspect disclosed herein, there is provided a processor configured to execute machine code instructions, each instruction being an instance of a predefined set of instruction types in an instruction set of the processor, wherein the instruction set includes a looping instruction defined by a corresponding opcode and comprising a register operand for holding a sequence of subinstructions, the looping instruction causing the processor to:

repeatedly execute the looping instruction without incrementing a program counter, each execution of the looping instruction comprising:
  executing one of the subinstructions in the register operand; and
  modifying the register operand to contain a different set of subinstructions.
In an example, modifying the register operand comprises shifting the subinstructions in the register operand.

In an example, modifying the register operand comprises modifying the register operand to contain a smaller set of subinstructions.

In an example, the looping instruction causes the processor to repeatedly execute the looping instruction until no subinstructions remain in the register operand.

In an example, the subinstructions comprise at least a fetch subinstruction causing the processor to load values to the register operand.

In an example, the subinstructions comprise at least a load subinstruction causing the processor to load values to a register of the processor.

In an example, the subinstructions comprise at least a fetch-load subinstruction causing the processor to load values to the register operand and load other values to a register of the processor.

In an example, the subinstructions comprise at least a multiply-accumulate subinstruction causing the processor to generate at least one result value by multiplying a respective first value by a respective second value, and to add the at least one result value to an accumulator in an output register of the processor.

According to a second aspect disclosed herein, there is provided a method of executing a looping instruction, said looping instruction being one of a predefined set of instruction types in an instruction set of a processor, said looping instruction being defined by a corresponding opcode and comprising a register operand for holding a sequence of subinstructions, the method comprising:

repeatedly executing the looping instruction without incrementing a program counter, each execution of the looping instruction comprising:
  executing one of the subinstructions in the register operand; and
  modifying the register operand to contain a different set of subinstructions.
In an example, modifying the register operand comprises shifting the subinstructions in the register operand.

In an example, modifying the register operand comprises modifying the register operand to contain a smaller set of subinstructions.

In an example, the method comprises repeatedly executing the looping instruction until no subinstructions remain in the register operand.

In an example, the subinstructions comprise at least a fetch subinstruction comprising loading values to the register operand.

In an example, the subinstructions comprise at least a load subinstruction comprising loading values to a register of the processor.

In an example, the subinstructions comprise at least a multiply-accumulate subinstruction comprising generating at least one result value by multiplying a respective first value by a respective second value, and adding the at least one result value to an accumulator in an output register of the processor.

According to a third aspect disclosed herein, there is provided a processor comprising:

a first register for storing elements of an input vector;
 a second register for storing a plurality of index tuples, each index tuple comprising at least an input index addressing an element of the input vector (X) in the first register;
 an output register comprising a plurality of accumulators for storing elements of an output vector;
 a vector unit configured to execute each index tuple in the second register in parallel by, for each index tuple:

i) generating a respective result value by multiplying the element of the input vector in the first register addressed by the input index of that index tuple by a corresponding kernel weight in a memory; and ii) adding the result value for that index tuple to one of the accumulators in the output register.

In an example, each index tuple comprises an output index addressing one of the accumulators in the output register, and executing each index tuple comprises added the result value for that index tuple to the accumulator addressed by the output index of that index tuple.

In an example, the output index of each index tuple only addresses a respective subset of the accumulators.

In an example, the input index of each index tuple only addresses a respective subset of the element of the input vector.

In an example, the processor is configured to, after executing a first plurality of index tuples, add a first set of result values to the accumulators in the output register, load a second set of index tuples to the second register, and execute the second set of index tuples to generate a second set of result values and add the second set of result values to the first set of result values already present in the accumulators.

In an example, the kernel weights are elements of a sparse matrix, and the processor is configured to generate the index tuples from the sparse matrix and store the index tuples to the second register.

In an example, the vector unit comprises a plurality of multipliers, and each multiplier is configured to execute a different respective one of the index tuples.

In an example, the processor comprises a plurality of input multiplexers, each input multiplexer having: a plurality of inputs, each connected to a different respective one of the elements in the first register; and an output connected to a different respective one of the multipliers.

In an example, the processor comprises a plurality of output multiplexers, each output multiplexer having: a plurality of inputs, each connected to a different respective one of the multipliers; and an output connected a different respective one of the accumulators in the output register.

In an example, the processor comprises the memory storing the kernel weights.

According to a fourth aspect disclosed herein, there is provided a method of generating an output vector, the method comprising:

accessing a first register of a processor storing elements of an input vector;

accessing a second register of the processor storing a plurality of index tuples, each index tuple comprising at least an input index addressing an element of the input vector in the first register;

using a vector unit of the processor to execute each index tuple in the second register in parallel by, for each index tuple:

i) generating a respective result value by multiplying the element of the input vector in the first register addressed by the input index of that index tuple by a corresponding kernel weight in a memory; and ii) adding the result value for that index tuple to one of a plurality of accumulators comprised in an output register of the processor.

In an example, the kernel weights are elements of a matrix, and the method comprises generating the index tuples from the sparse matrix and storing the index tuples to the second register.

In an example, said generating the index tuples is performed in response to determining that said matrix is a sparse matrix.

In an example, the method comprises shuffling rows of the sparse matrix prior to generating the index tuples.

In an example, said shuffling involves reducing a number of index tuples which include a null or zero value. In an example, the rows of the sparse matrix may be shuffled by sorting them according to the number of non-zero kernel weights present in each row.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

Figure 1:
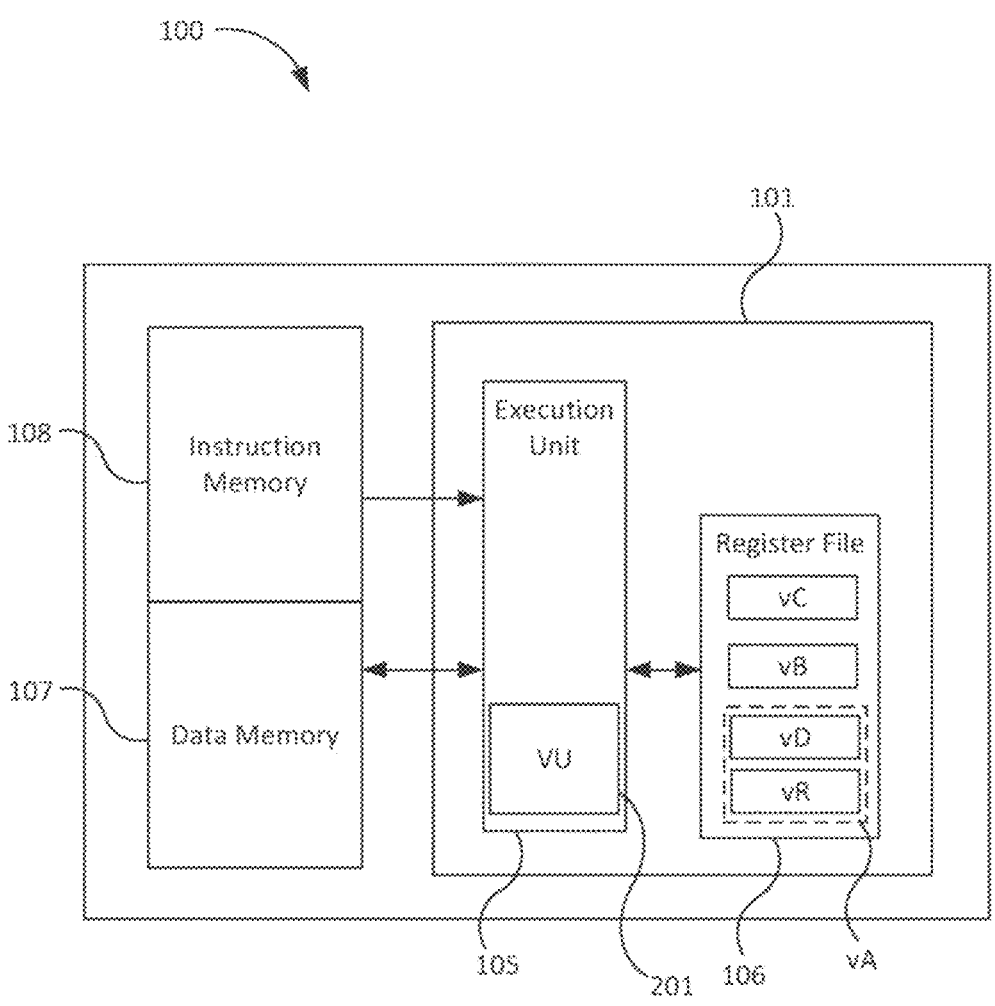
FIG. 1 illustrates an example computer system for implementing multiplications involving a sparse matrix.

As will be described, a new type of instruction of the instruction set of a processor, called a "looping instruction" is defined. The looping instruction and its implementation will be described with reference to a specific example of a looping instruction, called a Vector-Load-Sparse-Multiply-Accumulate (VLSMA) instruction which can efficiently execute multiplication operations involving sparse matrices encoded in a format known as a Sparse Matrix Compiled Object (SMCO). In the following, SMCOs and their implementation is first described, followed by a description of their efficient implementation using a looping instruction.

The "sparsity" of a matrix is the fraction of its elements that have a value of zero (i.e. the number of zero-elements as a fraction of the total number of elements). A matrix may be considered a "sparse" matrix if, for example, it has a sparsity of 0.5 (50%) or more. Similarly, a matrix may be considered "dense" if more than 50% of its elements are non-zero (i.e. has a density over 0.5). Similar terminology can apply to vectors, which can also be considered "sparse" or "dense".

Matrix multiplication involves determining each element of an output vector V by computing the inner product of an input vector X with a different respective row of the matrix M. In case of a sparse matrix M, many of the elements are zero and therefore do not contribute to the inner products, even when the input vector X is dense. An example is shown below using a matrix with a sparsity of 75%:

$$\begin{pmatrix} 8 \\ -4 \\ 0 \end{pmatrix} = \begin{pmatrix} 2 & 0 & 0 & 0 \\ 0 & 1 & -1 & 0 \\ 0 & 0 & 0 & 0 \end{pmatrix} \cdot \begin{pmatrix} 4 \\ -3 \\ 1 \\ 2 \end{pmatrix}$$

Here, for example, the elements V_i in the output vector V are calculated as shown below:

$$V\_1 = 8 = 2*4 + 0*-3 + 0*1 + 0*2$$

$$V\_2 = -4 = 0*4 + 1*-3 + -1*1 + 0*2$$

$$V\_3 = 0 = 0*4 + 0*-3 + 0*1 + 0*2$$

It can be seen, in this example, that only three terms (multiplications) actually contribute to the final answer: only one term of the first inner product (2*4) contributes to the first element of the output vector V_1; only two terms of the second inner product (1*−3, −1*1) contribute to the second element of the output vector V_2; and no elements of the third inner product contribute to the third element of the output vector V_3.

This means that nine out of twelve multiplication operations (the ones involving a zero-element of the matrix M) did not affect the final answer. When performed by a processor, these operations therefore waste time, memory bandwidth, and power. This problem is only worse in more realistic examples when the matrix M can be much larger than in the given example and therefore comprise even more zero elements (e.g. a matrix with size 16×32, and sparsity 90% would contain around 460 zero-elements). The present disclosure addresses these and other problems, thereby saving time, memory bandwidth, and power.

The matrix may be referred to as a "kernel" and the non-zero elements of the matrix may be referred to as "kernel weights" or "kernel coefficients". This terminology is common, for example, in the context of a neural network where the matrix may represent a transformation to be applied in a layer of the neural network.

FIG. 1 illustrates an example computer system 100 for implementing multiplications involving a sparse matrix. The computer system 100 comprises a processor 101, a data memory 107, and an instruction memory 108. The processor 101 comprises an execution unit 105 and a register file 106. It is appreciated that the computer system 100 shown in FIG. 1 is highly simplified and that in reality the computer system 100 may comprise many more components.

The processor 101 may be a pipelined processor which implements a plurality of pipeline stages. In a pipelined processor, the execution unit 105 is divided into a series of pipeline stages, each for performing a particular type of operation. The pipeline will typically include a fetch stage, decode stage, a register read stage, at least one compute stage, and one or more memory access stages. The instruction fetch stage fetches a first instruction from memory and issues it into the first stage of the pipeline. In the next processor cycle the decoded instruction passes down to the next stage in the pipeline, e.g. the register read stage. At the same time, the fetch stage fetches a second instruction from the instruction memory into the decode stage. In the next successive processor cycle after that, the first instruction is passed to the third pipeline stage, e.g. compute stage, while the second instruction is passed to the second pipeline stage, and a third instruction is issued into the first pipeline stage, and so forth. This helps keep the processor busy and thereby reduces latency, since otherwise the processor would need to wait for a whole instruction to execute before issuing the next into the execution unit.

The data memory 107 is the memory where the data to be operated upon by computations and the results of the computations may be ultimately stored. The data memory 107 may be stored on the same physical unit as the processor 101. Alternatively, the data memory 107 may be storage on a separate unit, e.g. an external memory. In embodiments such as shown in FIG. 1, the instructions (including the instructions referred to later below) are stored in, and fetched from, an instruction memory 108 that is separate from the data memory 107. These may be separate memory devices or separate regions of the same memory device. Either way, since the instruction memory 108 and data memory 107 have non-overlapping address spaces, this means there is no risk that the instruction fetches performed by the fetch stage 103 will contend with the data access (load or store) being performed by the memory access stages. The data memory may comprise, but is not limited to, volatile storage (e.g., random access memory), non-volatile storage (e.g., read-only memory), flash memory, or any combination of such memories.

The register file 106 comprises at least a first register vC for storing elements of the input vector X, a second register vB for storing index tuples (described below), and at least one output register vA implementing a set of accumulators A[i]. In this example, the accumulators A[i] are implemented using a third register vD and fourth register vD as will be described later below. In the case of a multi-threaded processor, the registers vC, vB, vD, vR are replicated for each thread. Although shown in FIG. 1 as part of the register file 106, it is appreciated that one or more of the registers vC, vB, vD, and vR may be implemented as a part of (i.e. inside of) the vector unit 201 (described below).

The execution unit 105 is operatively coupled to the instruction memory 108 and the data memory 107 and the register file 106. In operation, the execution unit 105 retrieves instructions from the instruction memory 108 and executes them, which may involve reading and/or writing data to and/or from the data memory 107 and/or register file 106, as is known per se in the art. As used herein, the term "instruction" refers to a machine code instruction, i.e. one of the fundamental instruction types of the instruction set of a processor, each instruction type defined by a single opcode and one or more operand fields. An operand can be an immediate operand, i.e. the value to be operated upon is encoded directly into the instruction; or alternatively an operand can take the form of an indirect operand, i.e. an address where the value to be operated upon can be found. For instance, an add instruction may take three pointers as operands: two specifying addresses from which to take values to be added, and another specifying a destination address to which to write the result.

The execution unit 105 is able to perform a limited set of operations in response to instructions from a predefined set, called the instruction set. A typical instruction set may comprise, for example, instructions such as LOAD, ADD, STORE, etc. which the execution unit 105 is configured to understand and implement in response to a respective instruction. Accordingly, the execution unit 105 generally comprises one or more arithmetic computation units for executing such instructions, such as a fixed-point arithmetic unit (AU), logic unit (LU), arithmetic logic unit (ALU), and floating point unit (FPU). Arithmetic refers to mathematical operations on numbers: e.g. multiply, add, divide, subtract, etc.

As illustrated in FIG. 1, the execution unit 105 also comprises a vector unit 201. The vector unit 201 is a hardware accelerator that has the capability to efficiently execute on vectors. That is, it can load bytes consecutively from memory 107, and can add, multiply, and subtract vectors of numbers in a pointwise manner.

In particular, the vector unit 201 comprises a set of multipliers (hardware multiplication units) VU[i], each configured to multiply two input (scalar) values together. The (scalar) result from each multipliers VU[i] is then written to one of the accumulators vA[i] as will be described later below to form the output vector V. The description below is focused mainly on optimising byte-wide arithmetic, but it is appreciated that the same principles apply to e.g. floating point numbers or numbers represented using fixed point representations.

The number of multipliers VU[i] and accumulators vA[i], as well as the size of the first register vC all have an impact on the size of matrix that the processor 101 can efficiently implement. In practice, the processor 101 may be constructed and arranged to operate on a matrix "block" of a fixed size. Larger matrices may be broken down into a plurality of such blocks, and each block processed separately using the techniques described herein. Generally, the number of multipliers VU[i] corresponds to the number of columns in the block, the number of accumulators vA[j] corresponds to the number of rows in the block, and the size of the first register vC is equal to the length of the input vector X.

For simplicity, the following will largely be described with reference to a 16×32 matrix (block) M, but it is appreciated that similar concepts apply in relation to blocks of different size. As such, it is assumed that there are 32 multipliers VU[0]-VU[31] and 16 accumulators vA[0]-vA [15].

As mentioned, the sparse matrix M is encoded into a new binary format: the Sparse Matrix Compiled Object (SMCO). A new type of instruction of the instruction set of the processor 101, called a "looping instruction" is defined. A specific example of a looping instruction, called a Vector-Load-Sparse-Multiply-Accumulate (VLSMA) instruction can efficiently execute the SMCO. In the following, SMCOs and their implementation is first described, followed by a description of their efficient implementation using a looping instruction.

An SMCO comprises only the non-zero values of the sparse matrix M, along with a corresponding index tuple. As an example, consider the following 16×32 matrix M:

$$
\begin{pmatrix}
0A000000 & 000B00C0 & 00000000 & 00000000 \\
0000D000 & 00000000 & 00000000 & 00000000 \\
00000000 & 000000E0 & 00000000 & 0000000F \\
00000000 & 000G0000 & 00000000 & 00000000 \\
H0I00J00 & 00000000 & 00000000 & 00000000 \\
00000000 & 00000000 & 000K0L00 & 00000000 \\
00000000 & 00000000 & 00000M00 & 00000000 \\
00000000 & 0000N000 & 00000000 & 00000PQ0 \\
00000000 & 00000000 & 00000000 & 00000000 \\
00000000 & 00000000 & 00000000 & 00000000 \\
00000000 & 00000000 & 00000000 & 00000000 \\
00000000 & 00000000 & 00000000 & 00000000 \\
00000000 & 00000000 & 00000000 & 00000000 \\
00000000 & 00000000 & 00000000 & 00000000 \\
00000000 & 00000000 & 00000000 & 00000000 \\
00000000 & 00000000 & 00000000 & 00000000 \\
\end{pmatrix}
$$

The SMCO for the example matrix above may comprise the following:

In this example, each index tuple in the SMCO comprises an input index and an output index. Each index tuple is associated with a respective one of the kernel weights (non-zero value in the matrix). The non-zero values may be stored in the data memory 107 and the index tuples may be stored in the second register vB.

The input index for a given kernel weight corresponds to the column in which that kernel weight appears in the sparse matrix M, and therefore indicates which element of the input vector X is to be multiplied by that kernel weight to generate the respective result value. The output index for a given kernel weight corresponds to the row in which that kernel weight appears in the sparse matrix M, and therefore indicates which element of the output vector V the respective result value should be added.

In operation, each index tuple (I_input, I_output) of the SMCO is executed by a different multiplier VU[i] of the vector unit 105. Specifically, each multiplier VU[I_input] multiplies the corresponding kernel weight by the element of the input vector X addressed by the input index I_input, and adds the result to the accumulator vA[I_output] addressed by the output index I_output. The multipliers VU[i] execute these operations in parallel and therefore the system in this example can handle up to 32 non-zero kernel weight in a single operation. If the matrix comprises fewer than 32 non-zero kernel weights, not all of the multipliers need to be used. The instruction for executing this task can therefore be divided into a plurality of different types of instructions ("MACC_n" instructions), each of which operates a different number of the multipliers. This is discussed in detail later below. On the other hand, if the matrix comprises more than 32 non-zero kernel weights, additional iterations can be performed and the additional results written to the accumulators vA[i] as appropriate.

For the purposes of illustration, the first four index tuples in the above example are executed as follows:

the first index tuple (1, 0) is executed by the first multiplier VU[0], which multiplies the first kernel weight (A) by the input vector element at address 1 (X_1) and adds the result (A*X_1) to the accumulator at address 0, i.e. vA[0];

the second index tuple (11, 0) is executed by the second multiplier VU[1], which multiplies the second kernel weight (B) by the input vector element at address 11 (X_11) and adds the result (B*X_11) to the accumulator at address 0, i.e. vA[0];

the third index tuple (14, 0) is executed by the third multiplier VU[2], which multiplies the third kernel weight (C) by the input vector element at address 14 (X_14) and adds the result (C*X_14) to the accumulator at address 0, i.e. vA[0]; and the fourth index tuple (4, 1) is executed by the fourth multiplier VU[3], which multiplies the fourth kernel weight (D) by the input vector element at address 4 (X_4) and adds the result (D*X_4) to the accumulator at address 1, i.e. vA[1].

Hence, in this example, the final result at accumulator vA[0] is A*X_1+B*X_11+C*X14 and the final result at accumulator vA[1] is D*X_4. Similar considerations apply for the remainder of the index tuples, but this is sufficient to

| Kernel Weight | A | B | C | D | E | F | G | H | I | J | K | L | M | N | P | Q |
|---|---|---|---|---|---|---|---|---|---|---|---|---|---|---|---|---|
| Input Index | 1 | 11 | 14 | 4 | 14 | 31 | 11 | 0 | 2 | 5 | 19 | 21 | 21 | 12 | 29 | 30 |
| Output Index | 0 | 0 | 0 | 1 | 2 | 2 | 3 | 4 | 4 | 4 | 5 | 5 | 6 | 7 | 7 | 7 |

9 demonstrate that result values can be added to the same accumulator or different accumulators as desired.

Figure 2:
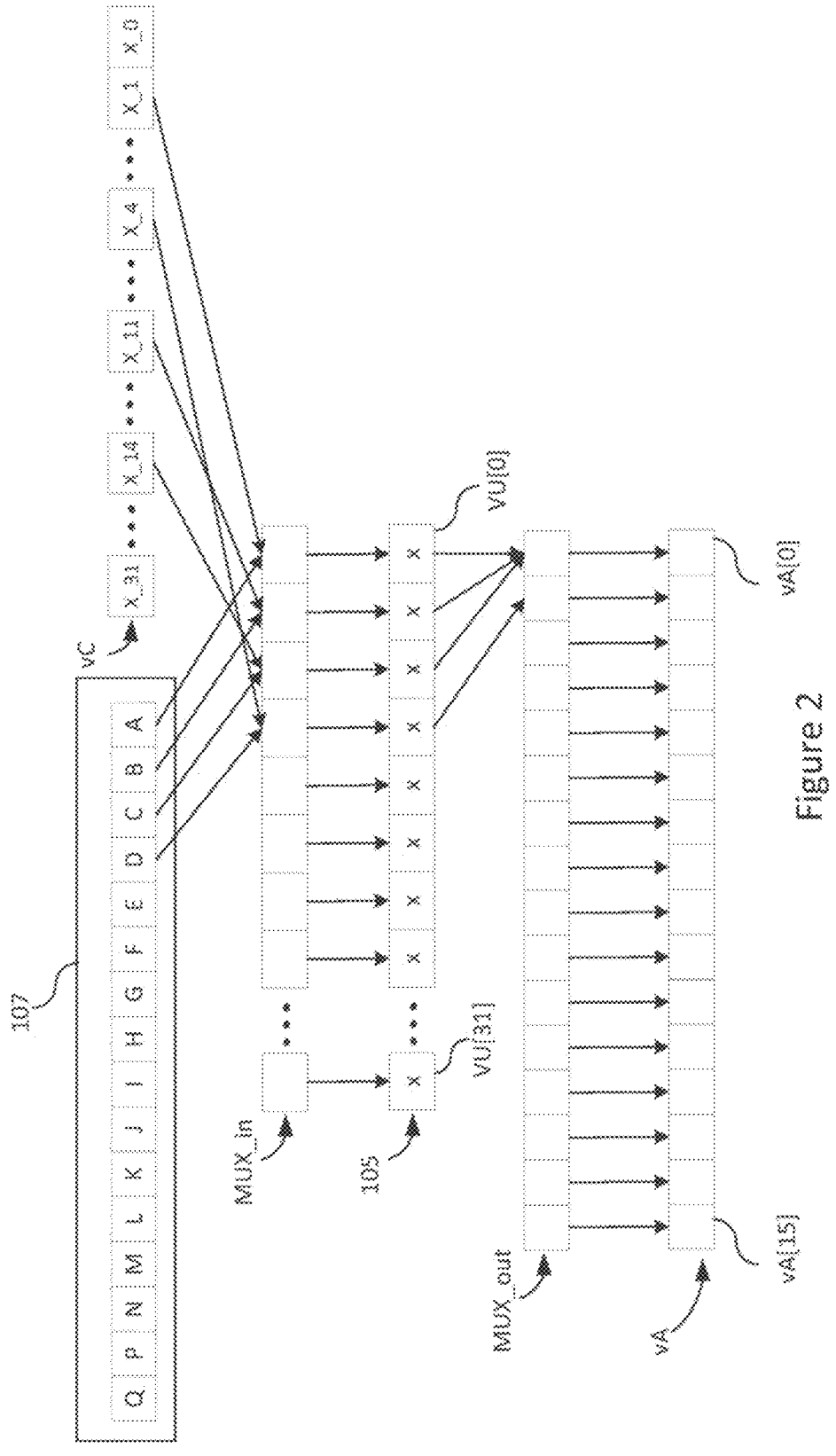
FIG. 2 shows schematically execution of four index tuples in accordance with examples described herein.

FIG. 2 shows schematically an example implementation of this using a set of input multiplexers (MUX_in) and a set of output multiplexers (MUX_out). In this example, there are 32 input multiplexers, corresponding to the 32 multipliers of the vector unit 201, and 16 output multiplexers, corresponding to the 16 accumulators vA.

The output of each input multiplexers is connected to a different respective one of the multipliers (i.e. input multiplexer K is connected at the output to multiplier VU[K]). Each input multiplexer has 32 inputs, connected to each element in the first register vC storing the input vector X elements. The selection of which input to activate for each input multiplexer is determined by the input indices, as described above.

The output multiplexers implement a 32-way adder. Specifically, the output of each output multiplexer is connected to a different respective one of the accumulators vA (i.e. output multiplexer K is connected at the output to accumulator vA[K]). Each output multiplexer has 32 inputs, connected to each multiplier VU[i]. The selection of which input to activate for each output multiplexer is determined by the output indices, as described above.

One advantage is that the elements of the input vector X for multiplication by each kernel value are specified indirectly (using the input indices as shown above). This means that the indices define a "shuffle" to be applied to the elements of the input vector X during loading, and this can be performed at the same time (in the same pipeline stage) as loading of the kernel values themselves.

It is noted that in order to address all 32 elements of the input vector X, the input index needs to be 5 bits long. Similarly, in order to address all 16 accumulators vA[i], the output index needs to be 4 bits long. In other words, in this example, each index tuple comprises 9 bits. Hence, while this example represents the most flexibility with regards to addressing input and output values, it also uses the most address space.

At the other extreme, each multiplier VU[i] may only be able to write to a different single one of the accumulators cept of a "slice" to generalise this trade-off with regards to the output index. It is appreciated that similar concepts can also be applies with regards to the input index (or both).

Consider a general case involving an m by n matrix or block, and K multipliers and L accumulators. The m rows of the matrix, K multipliers, and L accumulators are considered as being distributed across S slices. Hence, each slice corresponds to a different m/S rows of the matrix, a different K/S multipliers, and a different L/S accumulators. For each slice, non-zero kernel weights from its m/S rows of the matrix are handled by that slice's K/S multipliers, and the result values written to one of the corresponding L/S accumulators. Hence, only log_2(L/S) bits are required for the output address.

For the specific example of implementing a 16×32 matrix or block using K=32 multipliers and L=16 accumulators, it has been found that S=8 slices represents an optimal trade-off between system resources and flexibility for implementing sparse neural networks in a memory-constrained environment. In this case, each slice corresponds to a different m/S=16/8=2 rows of the matrix, a different K/S=32/8=4 multipliers, and a different L/S=16/8=2 accumulators. This means that only log_2 (L/S)=log_2(2)=1 bit is required for the output address, because the multipliers of each slice are limited to adding their result value to only one of two (different) accumulators.

In this example, there is "space" for up to 4 index tuples in each slice (as this is the number of multipliers in each slice). The slices are implicitly defined as every 4 index tuples in the SMCO. If a given slice contains fewer than 4 index tuples, then one or more "null" (e.g. all zeroes) index tuples are inserted in the SMCO as required. If a given slice contains more than 4 index tuples, then the additional index tuples are placed in a second SMCO to be executed after the first SMCO (and a third SCMO if the slice contains more than 8 index tuples, etc.).

The sparse matrix in this example is therefore represented as two SMCOs (note that the slice numbers are indicated for clarity only, and do not themselves form part of the SMCOs):

| SMCO-1: | | | | | | | | | | | | | | | |
| --- | --- | --- | --- | --- | --- | --- | --- | --- | --- | --- | --- | --- | --- | --- | --- |
| | Slice | | | | | | | | | | | | | | |
| | 0 | | | | 1 | | | | 2 | | | | 3 | | | |
| Kernel Weight | A | B | C | D | E | F | G | 0 | H | I | J | K | M | N | P | Q |
| Input Index | 1 | 11 | 14 | 4 | 14 | 31 | 11 | — | 0 | 2 | 5 | 19 | 21 | 12 | 29 | 30 |
| Output Index | 0 | 0 | 0 | 1 | 0 | 0 | 1 | — | 0 | 0 | 0 | 1 | 0 | 1 | 1 | 1 | vA[i] and therefore no output index is required (e.g. there may be the same number of multipliers as accumulators). This saves on address space, but limits what sorts of matrices can be processed efficiently, e.g. there is a limit on the number of non-zero kernel weights in a single row of the matrix M that the processor 101 can handle in a single iteration (the limit being equal to the number of multipliers VU[i] which can write to each accumulator vA[i]). Similarly, we note that we can reduce the number of bits used to store the input index.

It is appreciated, therefore, that there is a trade-off between system resources and flexibility when it comes to deciding how many bits to allocate for each of the input and output indices. The present disclosure introduces the con-

| SMCO-2: | | | | | | | | | | | | |
| --- | --- | --- | --- | --- | --- | --- | --- | --- | --- | --- | --- | --- |
| | Slice | | | | | | | | | | | |
| | 0 | | | | 1 | | | | 2 | | | |
| Kernel Weight | 0 | 0 | 0 | 0 | 0 | 0 | 0 | 0 | L | 0 | 0 | 0 |
| Input Index | — | — | — | — | — | — | — | — | 21 | — | — | — |
| Output Index | — | — | — | — | — | — | — | — | 1 | — | — | — |

Note that the first and second slices are needed in SMCO-2 to ensure that the non-zero kernel weight "L" and corresponding index tuple ends up in the correct slice (the third slice), but the fourth slice is not needed.

Figure 3:
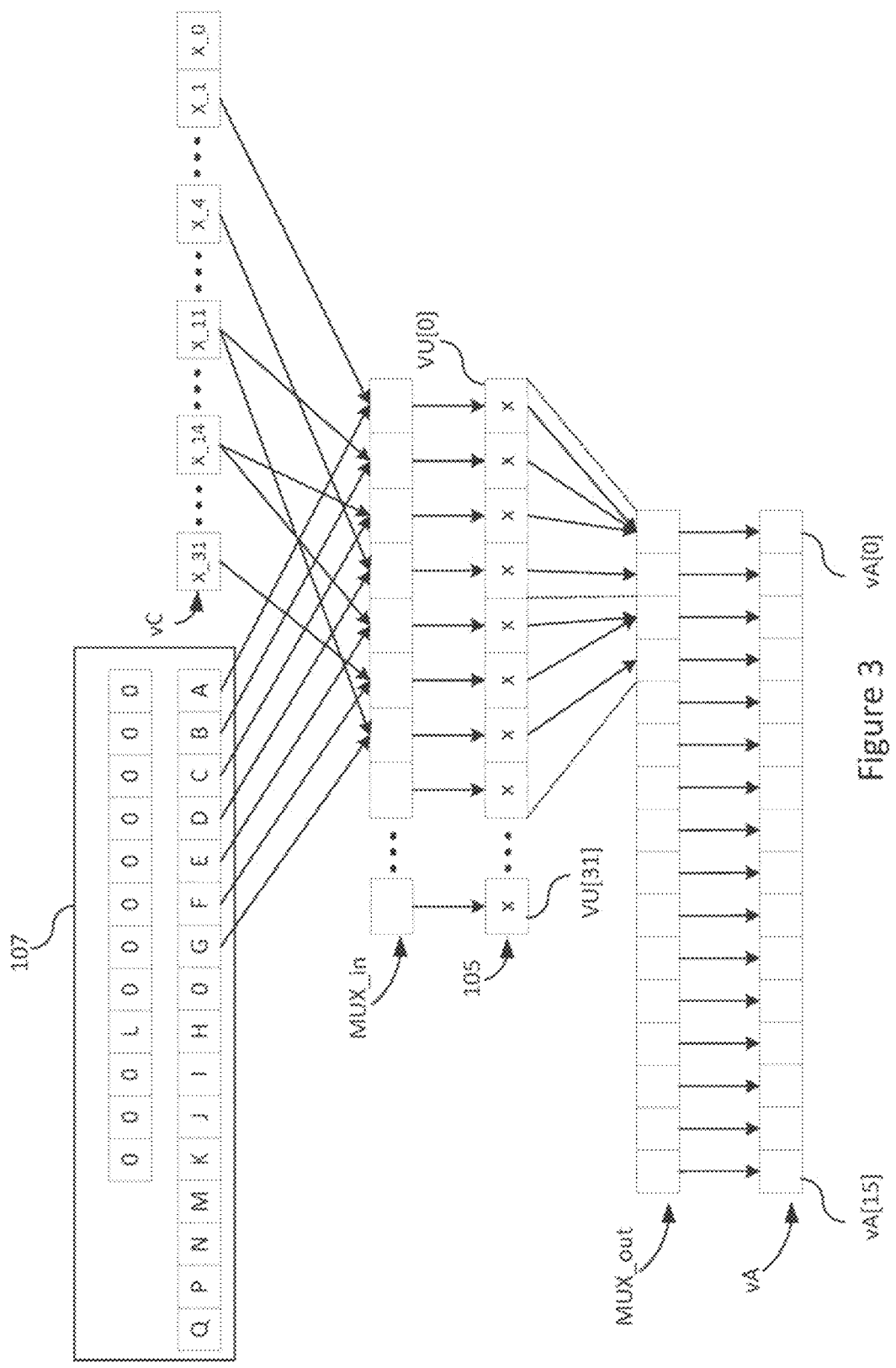
FIG. 3 shows schematically execution of an encoded sparse matrix in accordance with examples described herein.

FIG. 3 shows schematically execution of the first and second slices (of kernel values from SMCO-1). Similar considerations apply for the remaining slices (and SMCO-2). It is noted that execution of all of the slices is performed in parallel.

Again, in this example, the slices are executed using a set of input multiplexers MUX_in and output multiplexers MUX_out. Similarly to the earlier example, there are 32 input multiplexers. The output of each input multiplexers is connected to a different respective one of the multipliers (i.e. input multiplexer K is connected at the output to multiplier VU[K]). Each input multiplexer has 32 inputs, connected to each element in the first register vC storing the input vector X elements. The selection of which input to activate for each input multiplexer is determined by the input indices, as described above.

Also similarly to the earlier example, there are 16 output multiplexers, each with their output connected to a different respective one of the accumulators (i.e. output multiplexer K is connected at the output to accumulator vA[K]). However, one difference here is that each output multiplexer only comprises 4 inputs (rather than 32). The output multiplexers are divided into adjacent pairs, each adjacent pair defining a slice. Each adjacent pair of output multiplexers are connected to the same 4 multipliers 201. Hence, each "slice" corresponds to four adjacent multipliers and two adjacent output multiplexers. There is no overlap between the multipliers or output multiplexers of the slices (i.e. each multiplier and output multiplexer belongs to one and only one slice). Because there is a one-to-one correspondence between output multiplexers and accumulators, this also means that each slice contains a different two of the accumulators.

In FIG. 3, dotted lines are used to indicate the 4 multipliers VU[i] and 2 accumulators vA[i] of the slices in question. For example: the first slice comprises the first 4 multipliers VU[0]-VU[3] and the first 2 accumulators vA[0]-vD:vR[1]; the second slice comprises the second 4 multipliers VU[4]-VU[7] and the second 2 accumulators vA[2]-vA[3], and so on.

As shown in FIG. 3, in the first slice, the first index tuple (1, 0) is executed by the first multiplier VU[0], which multiplies the first kernel value (A) by the input vector element at address 1 (X_1) and adds the result (A*X_1) to the accumulator at address 0, i.e. vA[0]. Note that "address 0" here is limited to the accumulators of the first slice, i.e. the accumulator vA[0] and accumulator vA[1]. The second index tuple (11, 0) is executed by the second multiplier VU[1], which multiplies the second kernel value (B) by the input vector element at address 11 (X_11) and adds the result (B*X_11) to the accumulator at address 0, i.e. vA[0]. The third index tuple (14, 0) is executed by the third multiplier VU[2], which multiplies the third kernel value (C) by the input vector element at address 14 (X_14) and adds the result (C*X_14) to the accumulator at address 0, i.e. vA[0]. The fourth index tuple is executed by the fourth multiplier VU[3], which multiplies the fourth kernel value (D) by the input vector element at address 4 (X_4) and adds the result (D*X_4) to the accumulator at address 1, i.e. vA[1].

In the second slice, the fifth index tuple (14, 0) is executed by the fifth multiplier VU[4], which multiplies the fifth kernel value (E) by the input vector element at address 22 (X_22) and adds the result (E*X_22) to the accumulator at address 0. Note that "address 0" here refers to a different accumulator than it did for the first slice. Specifically, the multipliers of the second slice VU[4]-VU[7] are limited to addressing only accumulator vA[2] and accumulator vA[3]. The output index 0 within the context of the second slice is therefore interpreted to mean accumulator vA[2]. Hence, the result (E*X_22) from the fifth multiplier VU[4] is added to accumulator vA[2]. Similarly, the result from the sixth accumulator VU[5] is added to accumulator vA[2], which is addressed again by address 0. For similar reasons, the results from the seventh multiplier VU[6] is added to accumulator vA[3] which is addressed by address 1 within the context of the second slice. The eighth multiplier VU[7] executes the null index tuple. This may comprise adding zero to one of the accumulators or may comprise performing no action at all. Note that it does not matter which multiplier within the second slice executes the null index tuple (i.e. it does not matter where in SMCO-1 the null index tuple is inserted, as long as it is in the second slice). Similarly, in SMCO-2 the non-null index tuple (21, 1) for kernel weight L can be inserted anywhere within slice 2.

Once SMCO-1 has executed, the accumulators vA[i] will hold a partial result. SMCO-2 is then executed without resetting the accumulators vA[i], meaning that the result values from SMCO-2 will be added to the partial result. Once all the SMCOs (two in this example) have been processed, the accumulators vA[i] will hold the final output vector V for this block of the matrix. After this block of the matrix the next block to the right will be computed. This will add the partial results for that block to the matrix. This is repeated until all blocks in a row have been processed, whereupon the accumulators contain the final result for these 16 rows of the matrix. This is then stored as the output result.

Note that only the first four slices are needed to implement SMCO-1 and only the first three slices are needed to implement SMCO-2, but there are sufficiently many multipliers VU[i] for eight slices. It is therefore advantageous to shuffle the rows of the matrix M as a first step in order to move any rows having no non-zero elements to the end (bottom), as this will minimise the number of slices which need to be used.

Moreover, it is possible to define a set of different instructions, referred to herein as MACC_n (Muliply-ACCumulate) instructions which only operate on the first n slices, e.g. the example above would be implemented using a MACC_4 for SMCO-1 and then a MACC_3 instruction for SMCO-2 instruction. The MACC_n operations can be defined as sub-instructions residing in an operand register of a "looping instruction", as will now be described.

For simplicity, it will again be assumed that the processor 101 is configured to operate on a matrix "block" of size 16×32, using 32 multipliers and 16 accumulators, each divided into 8 slices. In such cases, the registers are specified as follows:

vC, is a general register which is used to hold (portions of) the input vector X. As explained below, a data pointer Dp and a data pointer offset Dp_offset are used to specify which values to load from memory 107 to vC. Generally, the length of the first register vC may correspond to the number of columns in the matrix M or block. In accordance with the continued example in which the processor 101 operates on a 16×32 matrix M or a 16×32 block of a larger matrix, the first register vC has a length of 32 bytes (each byte holding a respective element of the input vector X).

vB ("vBoggle") is used to hold various values including subinstructions to be executed. vB logically implements a first-in-first-out (FIFO) register. As explained below, a kernel pointer Kp is used to specify which values to load from memory 107 to vB. In operation, vB holds data that specifies how to use data from vC. The length of vB depends on the length of vC. As will become clear later below, the length of vB is non-linear with respect to the length of vC. For a vC register of length 32 bytes, vB may be 55-bytes long. Alternatively, vB may be 56 bytes long an implement a circular buffer in which the last byte is a pointer to the currently active element in the register vB (called the "head").

vD and vR are general registers which are used together to form the set of accumulators vA[i] discussed earlier. In accordance with the continued example 16 accumulators vA[0]-vA[15] can be provided, for example, if vD and vR together comprise a total of 64 bytes (which can hold 16 32-bit full-precision values). For example, vD and vR may each by 32 bytes long, although it is not excluded that vD and vR have different lengths form each other. It is also not excluded that a single register be used to implement the 16 (or other number of) accumulators vA[i].

Figure 4:
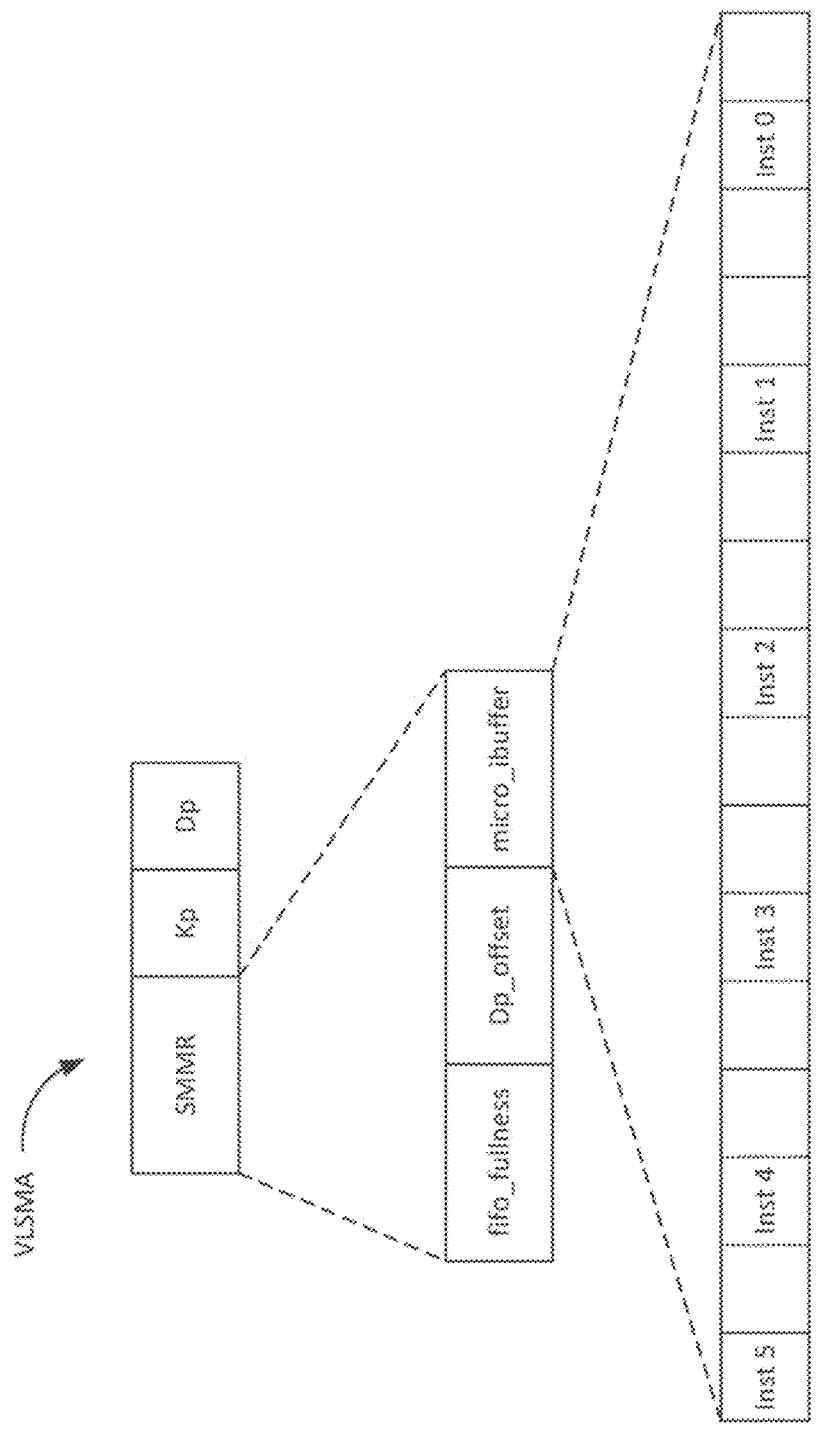
FIG. 4 shows a VLSMA instruction, a specific example of a looping instruction.

FIG. 4 shows a VLSMA instruction, a specific example of a looping instruction which can efficiently implement an SMCO. Upon executing a VLSMA instruction, the program counter is prevented from incrementing and the VLSMA instruction is kept for multiple issues. In other words, the VLSMA instruction performs an implicit conditional branch to itself, i.e. the program counter is normally not incremented, but the instruction is repeatedly executed up to such a time that the VLSMA instruction is finished. Specifically, the VLSMA instruction executes subinstructions that govern when it loads, multiplies, accumulates, terminates, and other behaviours. During each execution, the VLSMA instruction executes a single subinstruction.

The VLSMA instruction comprises three operands:

Sparse Matrix Master Register (SMMR). The SMMR operand is a read-write general purpose register operand that holds a sequence of subinstructions to be executed and other state (described below). The SMMR is initialised to zero.

A kernel pointer Kp. The kernel pointer Kp operand is a read-write register operand that points to a section of memory 107 that holds the kernel weights of the SMCO discussed earlier. The length of the kernel pointer Kp is determined by the matrix it is implementing.

A data pointer Dp. The data pointer Dp operand is a register operand that holds a pointer to the input vector X in memory 107. In examples, the data pointer Dp may be read-only. In other examples, assuming that the architecture comprises sufficient write-ports on the register file, the data pointer could be a read-write register. In the examples described below, it is assumed that the architecture only has two write ports and four read ports, which is not sufficient to implement a read-write data pointer, and therefore the data pointer Dp is a read-only register operand.

As shown in FIG. 4, the SMMR itself comprises:

fifo_fullness. This denotes the count of valid bytes in the second register vB. The length of fifo_fullness therefore depends on the size of vB. In an example, fifo_fullness may be 6 bits long, which is sufficient for a 55-byte vB.

Dp_offset. This is a data pointer Dp offset. In a microarchitecture with more than two write ports, this field is not needed as the data pointer Dp can be updated. With only two write ports, the data pointer Dp is a constant and this offset is updated to reflect moving along the input vector X. In other words, Dp_offset denotes the amount to dereference the data pointer Dp by when loading to the first register vC from memory 107. In an example, Dp_offset may be 10 bits long.

micro_ibuffer. The remaining 32−10=16 bits on a 32-bit architecture is the subinstruction buffer, "micro_ibuffer". This is a register holding subinstructions for execution. In an example, micro_ibuffer may hold up to 6 subinstructions. The micro_ibuffer may be 16 bits long, for example, and hold subinstructions encoded using 3 bits each.

The micro_ibuffer acts as a 6-subinstruction FIFO. The subinstructions are encoded using three bits each, and are shifted right (in this example, as shown in FIG. 4) in micro_ibuffer after each execution. Hence, the lowest three bits (the right-most in FIG. 4) of micro_ibuffer hold the current subinstruction, with the values in micro_ibuffer being shifted down three bits upon subinstruction execution, inserting zeroes into bits 15, 14, and 13 (the left-most in FIG. 4). This is summarised as shown below:

$$\text{micro\_ibuffer}[12:0]=\text{micro\_ibuffer}[15:3];$$
$$\text{micro\_ibuffer}[15:13]=0b000;$$

There are two types of subinstructions: "multiply-accumulate" subinstructions (MACCs), and "guard-subinstructions". There are eight MACCs and three guard-sub-instructions. Which type of subinstruction is performed depends on the state of the highest 13 bits, micro_ibuffer[3:], i.e. the bits of micro_ibuffer not being part of the current subinstruction (this is the left-most 13 bits in the example of FIG. 4).

The subinstructions are encoded as follows:

| If micro_ibuffer[3:] ! = 0 | | If micro_ibuffer[3:] = 0 | |
|---|---|---|---|
| subinstruction | Encoding | subinstruction | Encoding |
| MACC_1 | 000 | FETCH_LOADvC | 000 (special case only) |
| MACC_2 | 001 | FETCH_LOADvC | 001 |
| MACC_3 | 010 | FETCH | 010 |
| MACC_4 | 011 | TERM | 011 |
| MACC_5 | 100 | Undefined | 100 |
| MACC_6 | 101 | Undefined | 101 |
| MACC_7 | 110 | Undefined | 110 |
| MACC_8 | 111 | undefined | 111 |

Using the encoding above allows 16 bits in micro_ibuffer to be used to encode a sequence of five MACC instructions followed by a FETCH_LOADvC. Some examples are given below.

```
1 000 001 100 101 000 will be interpreted as:
MACC_1
MACC_6
MACC_5
MACC_2
MACC_1
FETCH_LOADvC
0 000 011 100 101 000 will be interpreted as:
MACC_1
MACC_6
MACC_5
TERM
```

US 12,608,206 B2

15                                                     16
-continued                                          -continued 0 000 000 000 000 000 will be interpreted as:
FETCH_LOADvC

|  | FETCH | FETCH LOADvC | MACC n | TERM | vB topup |
|---|---|---|---|---|---|
| Dp_offset | nop | +=1 | nop | nop | nop |
| micro_ibuffer | >>=3 | >>=3 | >>=3 | >>=3 | nop |
| Kp | nop | nop | +=4*n | nop | +=32 |
| vD:vR | nop | reorder | accumulate | nop | nop |
| program counter | nop | nop | nop | increment | nop |

Figure 5:
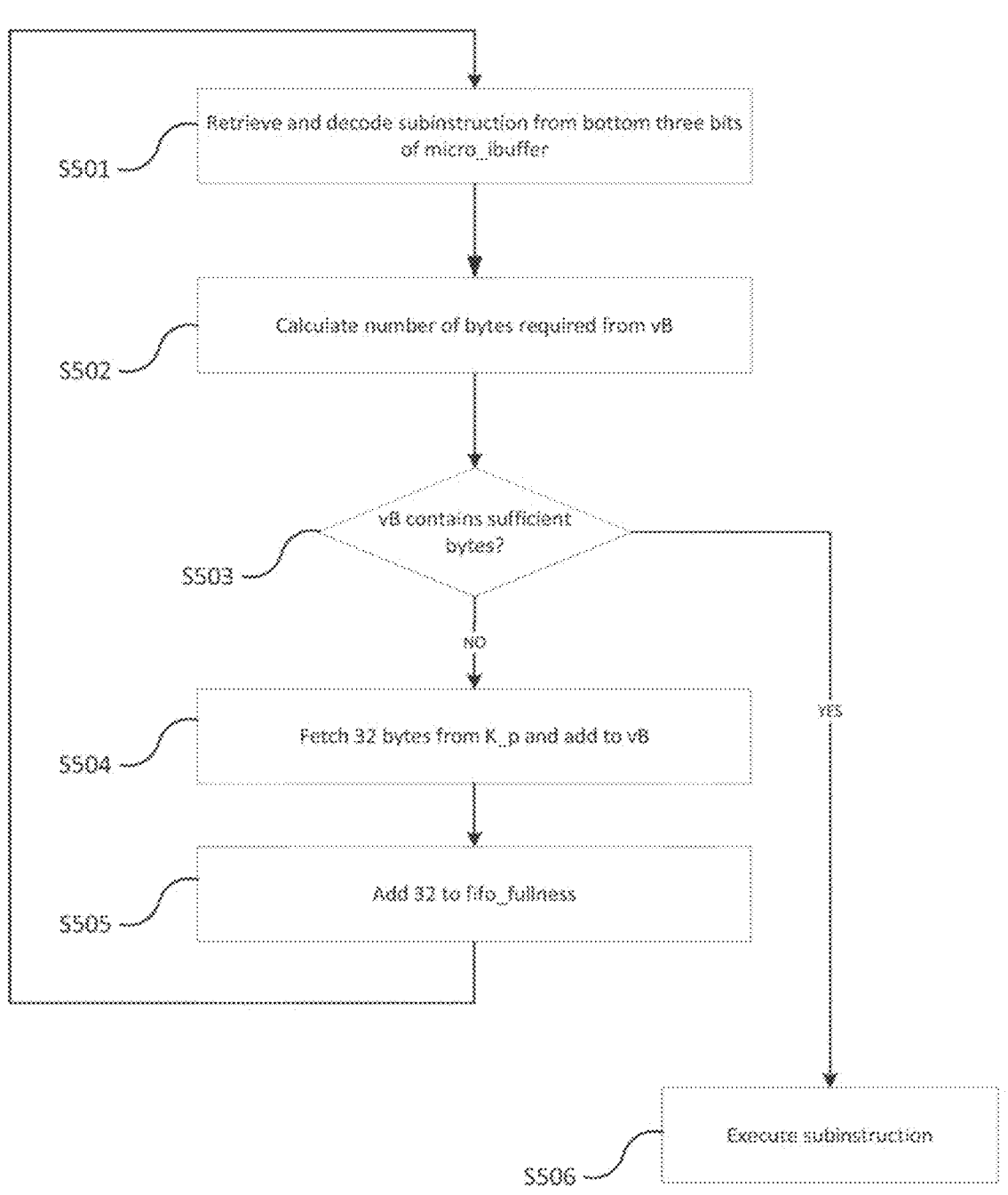
FIG. 5 shows schematically a flow diagram of VLSMA instruction execution.

FIG. 5 shows schematically a flow diagram of VLSMA instruction execution by the execution unit 105.

At S501, the current subinstruction is retrieved and decoded from micro_ibuffer. As mentioned above, the current subinstruction is the bottom three bits in micro_ibuffer, i.e. micro_ibuffer[:3]. The method then proceeds to S502.

At S502, the number of bytes required from vB to perform the current subinstruction is determined.

The number of bytes required in vB depends on the type of subinstruction, as will described later below. In short, the number of bytes required for each subinstruction is:

MACC_n requires 3*n bytes. This is because MACC_n implements n slices using (in this example) 4 multipliers each, which therefore require 4*n index tuples. Each index tuple in this example is 6 bits (1 bit for the output index and 5 bits for the input index), and therefore the 4*n index tuples required comprise 24*n bits or, as stated, 3*n bytes FETCH_LOADvC requires 3 bytes FETCH requires 3 bytes TERM requires 0 bytes The method then proceeds to S503.

At S503, it is determined whether or not vB contains sufficiently many bytes to perform the current subinstruction. That is, it is determined whether vB currently contains a number of valid bytes equal to or greater than the number of bytes required, as calculated at S502. If vB does not contain sufficiently many valid bytes, then the method proceeds to S504. If vB does contain sufficiently many valid bytes, then the method proceeds to S506.

At S504, 32 bytes are fetched from memory location indicated by the kernel pointer Kp and added to vB. The method then proceeds to S505.

At S505, fifo_fullness is incremented by 32 (indicating that 32 bytes have been added to vB at S504. The method then returns to S501. This time, the next subinstruction decoded at S501 was one fetched at S504, and vB is guaranteed to contain the number of bytes determined at S502. Therefore, the determination at S503 is "yes", and the method proceeds to S506. An advantage of this is that each execution is limited to one load from memory (otherwise, two memory access stages would be required in the pipeline).

At S506, the subinstruction is executed (note that the program counter is not incremented, in effect jumping to the same instruction).

The effect on the program state variables for each of the subinstructions is summarised below. For simplicity, the action performed at S504 and S505 of FIG. 3, denoted by vB_topup, is also included, although this is not itself a subinstruction (it is just an action which can take place during a subinstruction other than TERM).

|  | FETCH | FETCH LOADvC | MACC n | TERM | vB topup |
|---|---|---|---|---|---|
| fifo_fulness | −=3 | −=3 | −=3*n | nop | +=32 |
| vB | remove 3 bytes | remove 3 bytes | remove 3*n bytes | nop | add 32 bytes |
| vC | nop | write 32 bytes | read 4*n bytes | nop | nop |

The behaviours of the individual subinstructions will now be discussed.

TERM terminates the VLSMA instruction by incrementing the program counter. Note that all other subinstructions do not advance the program counter, causing the instruction to be repeated. The SMMR is reset to zero. In an example, only the upper 16 bits of the SMMR are reset to zero. This is preferential as it leaves the register ready to go again.

Figure 6:
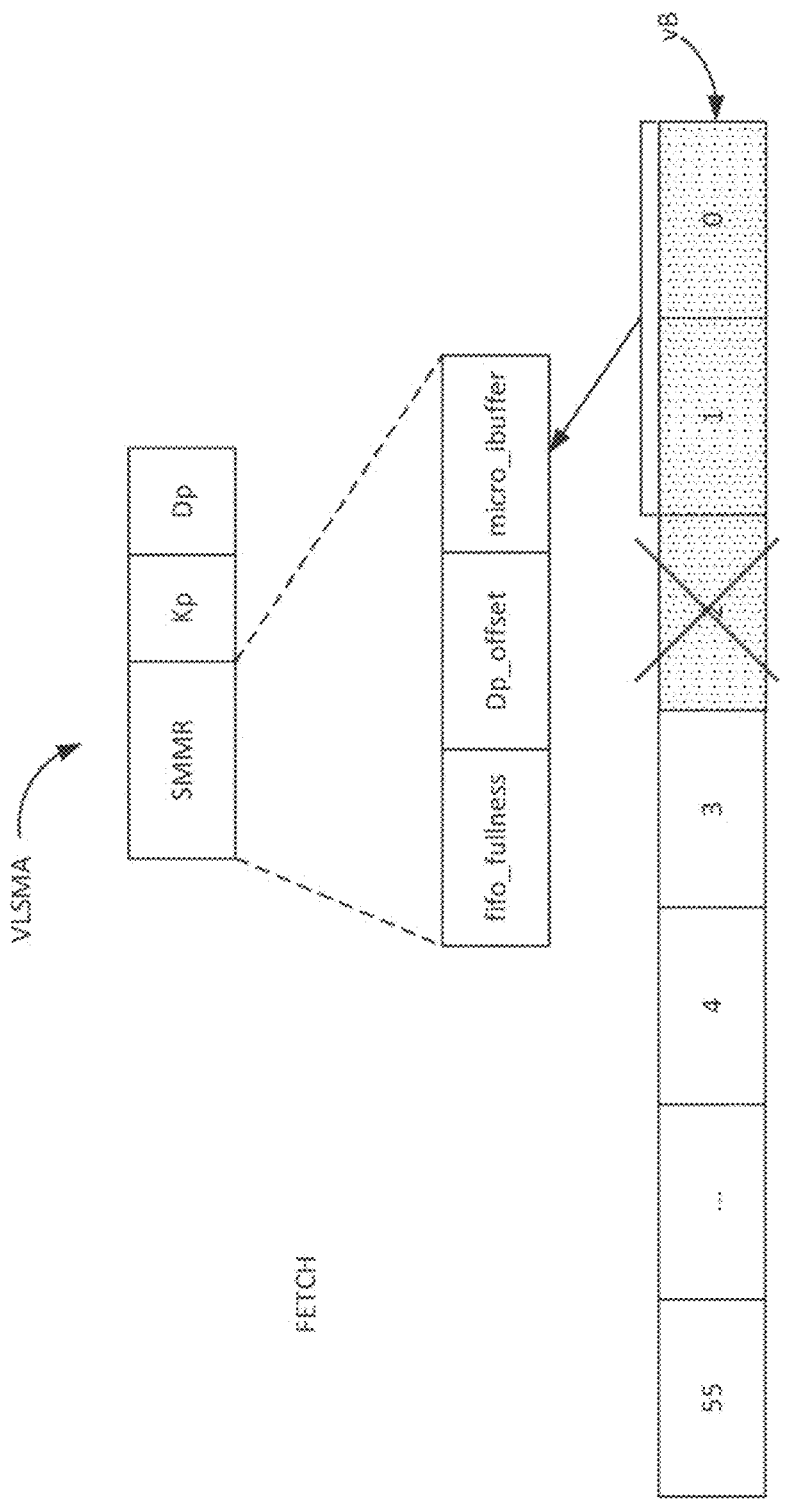
FIG. 6 shows schematically FETCH operation.

FIG. 6 shows a FETCH operation. FETCH fetches the first 2 bytes (16 bits) from vB and places them into micro_ibuffer[15:0] (thereby filling the subinstruction buffer). The next (i.e. third) byte of vB is disposed of. vB is then shifted by 3 bytes total. Accordingly, fifo_fullness is decremented by 3 once the FETCH is complete. In other words, this subinstruction loads new subinstructions for execution.

Figure 7:
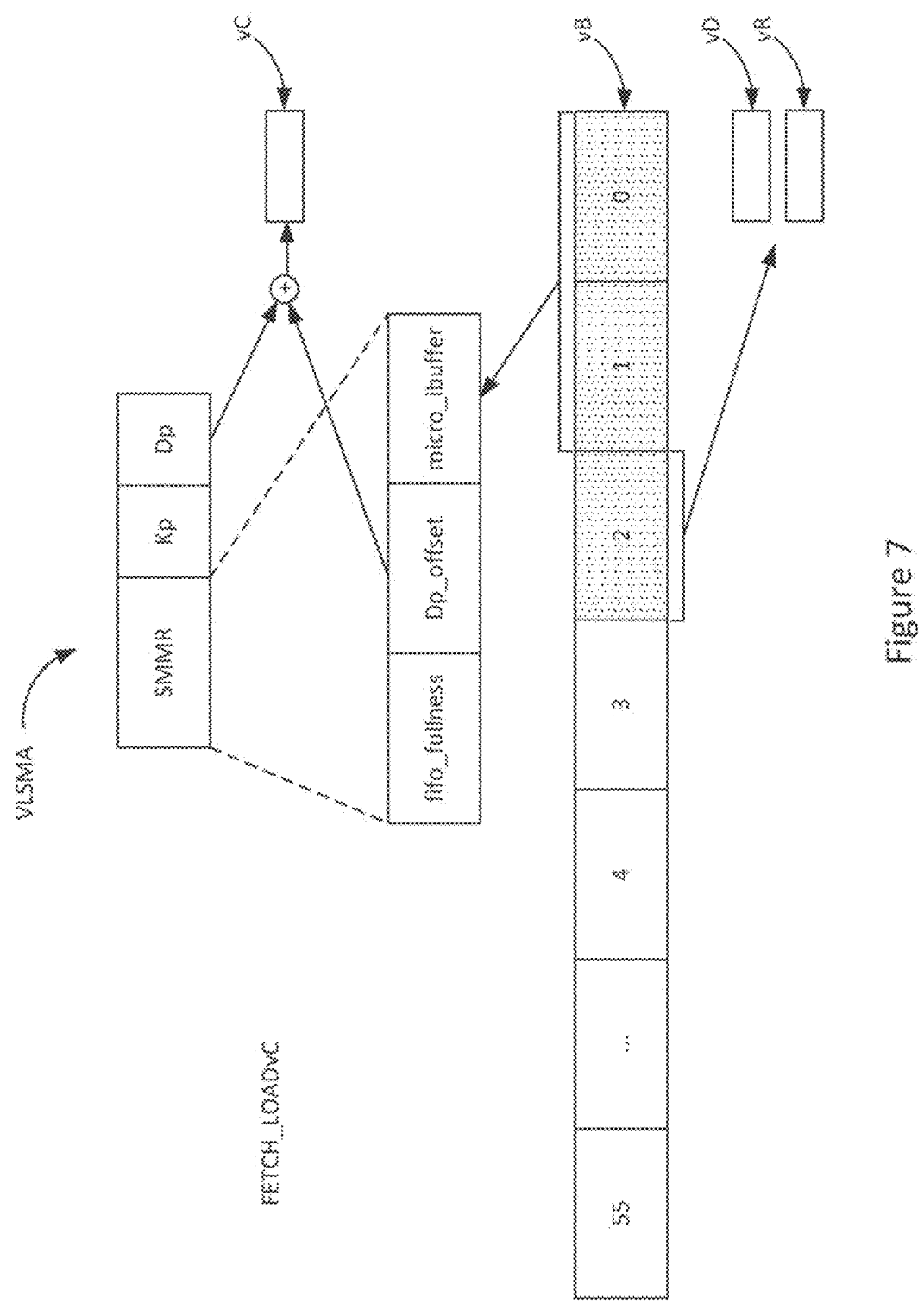
FIG. 7 shows schematically a FETCH_LOADvC operation.

FIG. 7 shows a FETCH_LOADvC operation. FETCH_LOADvC fetches the first 2 bytes (16 bits) from vB and places them into micro_ibuffer[15:0]. Unlike, FETCH, the third byte is not discarded. Instead, the third byte of vB is used to reorder the accumulator vD:vR as will be described in more detail later below. Accordingly, fifo_fullness is decremented by 3. In addition, FETCH_LOADvC also fetches the memory at address Dp+Dp_offset*32 and loads it into vC. In other words, this subinstruction loads new subinstructions for execution and also fills vC with input vector X values. The data pointer offset Dp_offset is then incremented by 1 (which means that the next portion of the input vector X will be fetched next time).

At the point at which a MACC_n operation is executed, vC holds values of the input vector X, memory 107 holds the kernel values, and vB holds a vector called "indirect". "Indirect" is 3*n bytes long and comprises 4*n index tuples as discussed earlier. In this example, with the output indices encoded using 1 bit and the input indices encoded using 5 bits, the input indices occupy indirect[i*6+4: i*6] and the output indices occupy indirect[i*6+5] for i in the range 0 . . . 4*n.

The MACC_n subinstruction accumulates into 16 parallel accumulators vA as discussed above. Specifically, a MACC_4 operation was described as an example earlier with reference to FIG. 3. In general, to execute MACC_n, the following is calculated:

$$mult[i] = \text{kernel}[i] * vC\big[\text{indirect}[i*6+4:i*6]\big]$$

for each i in the range 0 . . . 4*n. In other words, the full precision product of a freshly loaded kernel value (i.e. a coefficient from the sparse matrix M) with the value found in vC at the input index from indirect is calculated. The indirection enables the storing of only the non-zero kernel values. Holding the indirection values in a separate register also allows the memory access of reading the kernel values to overlap with the shuffling of vC by putting these in parallel pipeline stages.

The example sparse matrix described earlier can be implemented using a single looping instruction comprising the following subinstructions:

```
(implicit filling of vB)
FETCH_LOAD_vC
MACC_4
MACC_3
TERM (0 cycles: absorbed into MACC_3)
```

This requires 4 cycles rather than the usual 16.

This multi-cycle execution behaviour of the looping instruction allows the entire SMCO execution to be coded using a single library function (the VLSMA in this example). There is therefore no need to code any inner-loops. The looping instruction also includes explicit state, and allows for fast and precise interrupts. That is, if the processor received an "interrupt" the program can be stopped between any two sub instructions. The general purpose register used for operand 1 will at this point hold the instructions that are still to be executed. After processing the interrupt, the VLSMA instruction can be executed as normal, and it will resume executing sub instructions as if the interrupt never happened. Specifically, there is no hidden state that needs to be saved on the interrupt, only the general purpose registers need to be saved as normal. If the interrupt were to cause a "context switch" of an operating system, then only the vector and scalar registers need to be saved.

The processor may be a multi-threaded processor. In a multi-threaded processor, the processor comprises a plurality of sets of context registers, each set of context registers representing a context (i.e. program state) of a respective one of multiple currently-executing program threads. The program state comprises a program counter for the respective thread, operands of the respective thread, and optionally respective status information such as whether the thread or context is currently active. The processor further comprises a scheduler which is configured to control the instruction fetch stage to temporally interleave instructions through the pipeline, e.g. in a round-robin fashion. Threads interleaved in such a manner are said to be executed concurrently. In the case where the execution unit is pipelined, then as the instruction of one thread advances through the pipeline from one pipeline stage to the next, the instruction of another thread advances down the pipeline one stage behind, and so forth. This interleaved approach is beneficial as it provides more opportunity for hiding pipeline latency. Without the interleaving, the pipeline would need mechanisms to resolve dependencies between instructions in the pipeline (the second instruction may use the result of the first instruction, which may not be ready in time), which may create a pipeline bubble during which the second and further instructions are suspended until the first instruction has completed execution.

Reference is made herein to data storage for storing data. This may be provided by a single device or by plural devices. Suitable devices include for example a hard disk and non-volatile semiconductor memory (including for example a solid-state drive or SSD).

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A processor configured to execute machine code instructions, each instruction being an instance of a predefined set of instruction types in an instruction set of the processor, wherein the instruction set includes a looping instruction defined by a corresponding opcode and comprising an operand specifying an operand register for holding a sequence of subinstructions, the looping instruction causing the processor to:

repeatedly execute the looping instruction without incrementing a program counter, each execution of the looping instruction comprising:

executing one of the subinstructions from the operand register, and modifying content of the operand register to contain a different set of subinstructions.

2. The processor according to claim 1, wherein the modifying of the content of the operand register comprises; shifting the subinstructions in the operand register.

3. The processor according to claim 1, wherein the modifying of the content of the register operand comprises; modifying the content to contain a smaller set of subinstructions.

4. The processor according to claim 3, wherein the looping instruction causes the processor to repeatedly execute the looping instruction until no subinstructions remain in the operand register.

5. The processor according to claim 1, wherein the subinstructions comprise at least a fetch subinstruction causing the processor to load values to the operand register.

6. The processor according to claim 1, wherein the subinstructions comprise at least a load subinstruction causing the processor to load values to a register of the processor.

7. The processor according to claim 1, wherein the subinstructions comprise at least a fetch-load subinstruction causing the processor to load values to the operand register and load other values to a register of the processor.

8. The processor according to claim 1, wherein the subinstructions comprise at least a multiply-accumulate subinstruction causing the processor to generate at least one result value by multiplying a respective first value by a respective second value, and to add the at least one result value to an accumulator in an output register of the processor.

9. A method of executing a looping instruction, said looping instruction being one of a predefined set of instruction types in an instruction set of a processor, said looping instruction being defined by a corresponding opcode and comprising an operand specifying an operand register for holding a sequence of subinstructions, the method comprising:

repeatedly executing the looping instruction without incrementing a program counter, each execution of the looping instruction comprising:

executing one of the subinstructions in the operand register; and modifying content of the operand register to contain a different set of subinstructions.

10. The method according to claim 9, wherein the modifying of the content of the operand register comprises: shifting the subinstructions in the register operand.

11. The method according to claim 9, wherein the modifying of the content of the operand register comprises; modifying content of the operand register to contain a smaller set of subinstructions.

12. The method according to claim 11, comprising repeatedly executing the looping instruction until no subinstructions remain in the operand register.

13. The method according to claim 9, wherein the subinstructions comprise at least a fetch subinstruction comprising loading values to the operand register.

14. The method according to claim 9, wherein the subinstructions comprise at least a load subinstruction comprising loading values to a register of the processor.

15. The method according to claim 9, wherein the subinstructions comprise at least a multiply-accumulate subinstruction comprising generating at least one result value by multiplying a respective first value by a respective second value, and adding the at least one result value to an accumulator in an output register of the processor.

* * * * *